Patented July 1, 1941

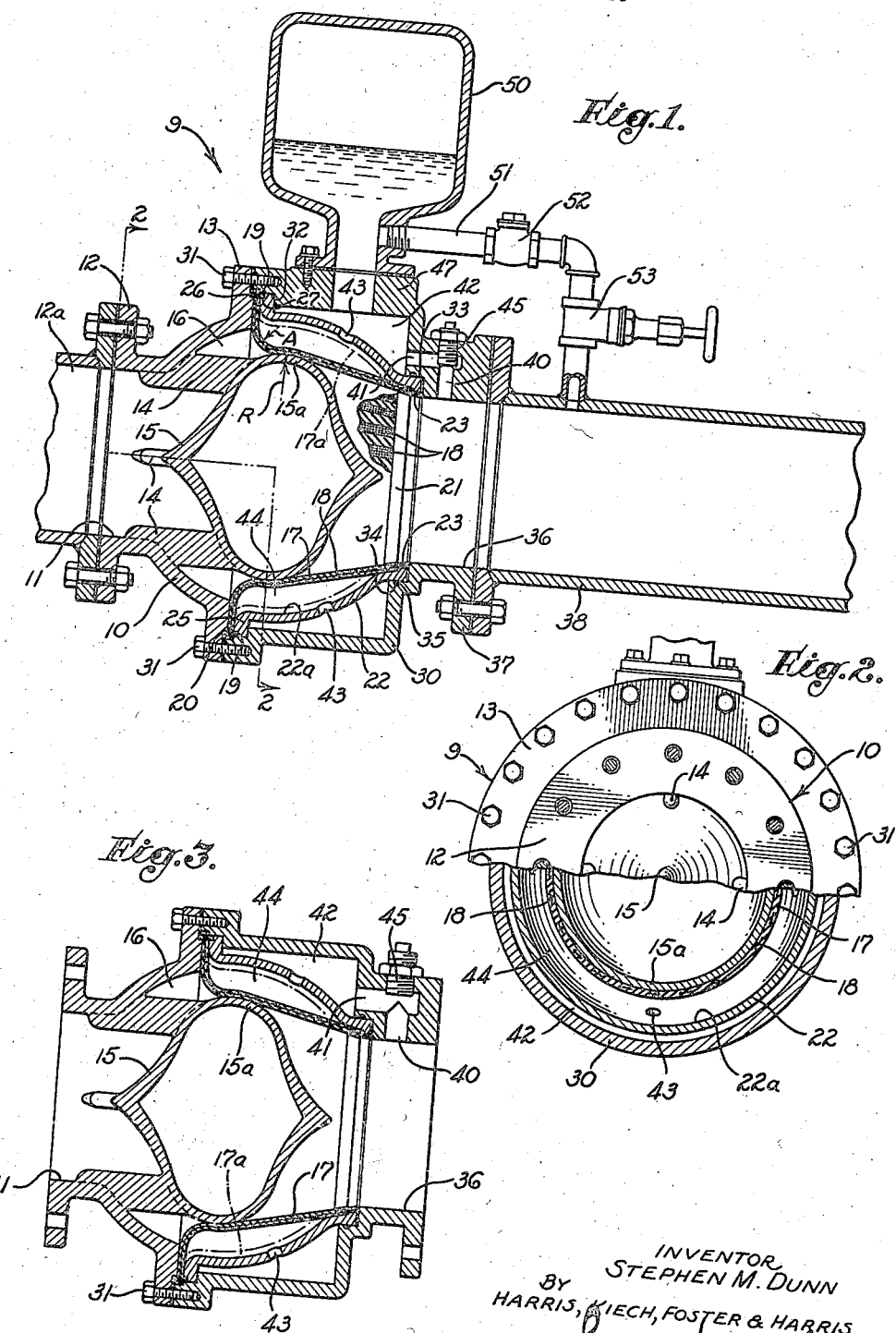

2,247,363

UNITED STATES PATENT OFFICE 2,247,363

VALVE DEVICE

Stephen M. Dunn, Los Angeles, Calif.

Application February 13, 1939, Serial No. 256,147

18 Claims. (Cl. 251—122)

My invention relates to valve devices for the control of fluid flow, and particularly to a check valve.

An object of the invention is to provide a valve which seals tightly in the closed position and, when open, permits fluid to flow therethrough with a minimum of turbulence and offers very little resistance to the flow of fluid therethrough.

Another object is to provide a valve in which closure is effected by a collapsible flexible sleeve member in sealing contact with a central core, and in which, in the closed position of the valve, the flexible sleeve member is maintained in tension to tightly hold it in sealing contact with the core.

Another object is to provide a check valve which will promptly close upon decrease of fluid pressure on its inlet side.

A further object is to provide a valve device adapted to close automatically upon a predetermined variation in the pressure differential on the fluid flowing through the valve device.

Another object is to provide a check valve which may be adjusted either to open or to remain closed when a sudden pressure surge in the outlet line occurs while the valve is in a closed position by reason of a higher pressure on its outlet side.

Still another object of the invention is to provide a valve that is easy and cheap to construct, is convenient and efficient in operation, and is of long life.

These and other apparent objects I attain in a manner which will be clear from consideration of the following description taken in connection with the accompanying drawing, of which:

Fig. 1 is a sectional view of the valve of my invention.

Fig. 2 is a sectional view of the valve of Fig. 1 taken along the line 2—2, as indicated.

Fig. 3 is a sectional view of an alternative form of my valve.

Referring to the drawing, Figs. 1 and 2 show my valve device 9, which includes a first housing member 10 having a central inlet passage 11 communicating with the interior thereof and having at one end a flange 12 connected to inlet piping 12a. The inlet piping 12a leads from a source of fluid under pressure, such as a centrifugal pump (not shown). The other end of the first housing member 10 is provided with an outwardly directed flange 13, and supported on the interior of the first housing member 10 by a plurality of circumferentially spaced webs 14, or otherwise, and axially aligned with the housing member is a central core 15. The central core 15 is preferably a hollow closed body of ellipsoidal form in its middle portion and extends to a point at both ends thereof to provide a streamline effect, although it will be evident that cores of other shapes may be used without departing from the spirit of the invention. The exterior of the central core 15 is preferably coated with a vitreous enamel or other smooth corrosion-resistant surface, although this provision may be omitted if desired. The space between the central core 15 and the first housing member 10 forms an annular passage 16 communicating with the inlet passage 11 between the webs 14.

A flexible member 17 is provided, forming the movable valve member of the invention, and is preferably made of rubber or other suitable resilient material, being reinforced for longitudinal tension by means of a plurality of strands or tapes 18 made of metal fabric, or other suitable reinforcing material embedded in or otherwise attached to the flexible member 17. The tapes 18 are preferably circumferentially spaced from each other and are disposed longitudinally relative to the flexible member 17. It will be understood, however, that the tapes 18 may be disposed along a slight spiral relative to the flexible member 17 if desired to take up additional slack in the flexible member, or may be dispensed with entirely under some circumstances without departing from the invention. The flexible member 17 is preferably of such construction that it offers substantially no resistance to bending and is such that longitudinal tension therein is substantially the only force effective in determining the shape of the flexible member.

The tapes 18 extend at one end through holes 19 in a ring element 20 and are soldered or otherwise suitably secured relative thereto. The other ends of the tapes 18 pass through suitable holes in a flanged ring 21 and into holes 23 in a supporting member 22, and are soldered or otherwise secured to the supporting member in such a manner that the flexible member 17 is securely anchored thereto with the flanged ring 21 tightly clamped therebetween. The supporting member 22 has a concave internal surface 22a and is provided at its inner end with a flange 25. The flange 13 of the first housing member 10 and the flange 25 are provided with annular recesses 26 and 27, respectively, to accommodate the ring 20. A second housing member 30 is clamped by bolts 31 against the flange 13 of the first housing member 10, and encloses the flexible member 17 and the supporting member 22, having an annular recess 32 to accommodate the flange 25 and the ring 20, and having an annular recess 33 to accommodate the outer end of the supporting member 22. The annular recess 33 is provided with an annular packing groove 34 in which suitable packing 35 is positioned to form a fluid seal between the supporting member 22 and the second housing member 30. Although I have described a preferred embodiment incorporating a particular anchoring means for the flexible element 17 and a specially formed supporting member 22 therefor, it is to be understood that the flexible element may be anchored by any suitable construction, and that the supporting member may be dispensed with if desired, without departing from the spirit of my invention.

It will thus be understood that the flexible member 17 is preferably secured to the supporting member 22 at one end and that the other end thereof is preferably tightly clamped between the supporting member and the flange 13 of the first housing member by the clamping action of the second housing member 30. It is also to be noted that the flexible member 17 is of such length that when it is in collapsed position, as shown in Fig. 1, it is stretched tightly over an area of considerable axial width of the convex middle portion 15a of the central core 15 in sealing contact therewith, and that when the flexible member 17 is in expanded position, as indicated by the dotted lines 17a in Fig. 1, it rests snugly against the inner concave surface 22a of the supporting member 22. It will be apparent that the flexible member 17 may be provided with increased or decreased slack by increasing or decreasing the concavity of the inner concave surface 22a of the supporting member 22, or by disposing the tapes 18 in a spiral direction relative thereto.

The second housing member 30 is provided with a discharge passage 36 which communicates between the flexible member 17 and the central core 15 with the annular passage 16, and through the latter with the inlet passage 11, this communication forming the main valve passage of my invention. The second housing member 30 is also provided with a flange 37 suitably connected to discharge piping 38 which leads to a point of disposal or discharge (not shown), and has intersecting fluid passages 40 and 41 forming communication between the discharge passage 36 and a space 42 formed between the supporting member 22 and the second housing member 30. The supporting member 22 is also provided with a plurality of apertures 43 communicating between the space 42 and a space 44 between the supporting member 22 and the flexible member 17. A valve element is threadedly received in the second housing member 30 and is axially aligned with the passage 40 so that by screwing the valve element toward or away from the passage 40 the fluid flow therethrough may be restricted as desired. If desired, a plurality of fluid passages similar to the passages 40 and 41 may be provided at circumferentially spaced locations around the second housing member 30, and a valve element similar to the valve element 45 may be provided to cooperate with each of such passages to increase the total cross-sectional flow area through the passages, which may be advisable in large constructions. While I prefer to form the passages 40 and 41 directly in the second housing member 30, it is to be understood that they may be dispensed with and suitable piping may be provided outside of the housing to accomplish the same function, automatic or manually operated valve means being provided therein.

The second housing member 30 is provided with a flat boss 47 having an opening therethrough communicating with the space 42 and communicating with a surge chamber 50, containing air or other gas, suitably mounted on the boss. Communicating with the lower portion of the surge chamber 50 is a conduit 51 leading to the discharge piping 38. The conduit 51 is provided with a check valve 52, of any type well known in the art, adapted to permit fluid to flow from the outlet piping 38 toward the surge chamber 50 but preventing a fluid flow in the opposite direction. A manually operated valve 53 is also provided in the line of the conduit 51, by which an operator may open or close communication through the conduit as desired. The conduit 51, and associated elements, may be entirely dispensed with if desired.

In operation, when it is desired to use the valve device 9 as a discharge check valve, the inlet piping 12a is connected to a suitable source of fluid under pressure, such as a centrifugal pump (not shown), and the discharge piping 38 is connected to a fluid system providing a fluid back pressure in the discharge piping. Assuming that the flexible member 17 is in sealing contact with the central core 15, so as to close the main valve passage, and the valve element 45 is adjusted so as to provide fluid communication between the discharge passage 36 and the spaces 42 and 44 through the passages 40 and 41 and the apertures 43, the pressure exerted by the fluid in the space 44 against the back of the flexible member 17 will be equivalent to the fluid pressure in the discharge passage 36, which is greater than the pressure of the fluid in the inlet passage 11 and the annular passage 16, and the flexible member 17 will remain in sealing contact with the central core 15. Upon a sufficient rise in the pressure of the fluid in the inlet passage 11 and the annular passage 16, due to operation of the pump or other source of fluid under pressure, the fluid pressure in the annular passage 16 will overbalance the fluid pressure in the space 44 and the flexible member 17 will move outwardly toward the position shown in dotted lines 17a in Fig. 1 to permit the fluid to flow from the inlet passage 11 through the main valve passage to the discharge passage. As the flexible member 17 moves outwardly toward the position shown in the dotted lines 17a, excess fluid in the space 44 is forced into the surge chamber 50, or out through the passages 41 and 40 into the discharge passage 36, or both. Outward movement of the flexible member 17 under such conditions is rapid, the flexible member quickly assuming the position shown in the dotted lines 17a in which it snugly engages the supporting member 22 to form a smooth wall of the then open main valve passage, which is an important feature of my invention as it reduces flow friction to a minimum. As fluid flow continues through the main valve passage, the fluid pressure within the surge chamber and the space 42 will gradually approach the same value as the fluid pressure in the discharge passage 36, the fluid pressures substantially equalizing through the passages 40 and 41.

Upon a drop in fluid pressure in the inlet passage 11, due to a cessation in pumping or from any other cause, this pressure drop is communicated through the annular passage 16 to the fluid between the flexible member 17 and the core 15, and since equalization of fluid pressures between the spaces 44 and 42 and the discharge passage 36 is retarded by the restricted communication therebetween controlled by the setting of the valve element 45, the fluid pressures acting on the inside and outside of the flexible member 17 immediately become substantially unbalanced, with a relatively high fluid pressure in the space 42 and a relatively low fluid pressure in the main valve passage. Relatively high fluid pressure in the space 42 is applied through the ports 43 to the areas of the flexible member 17 exposed by the ports 43 causing the flexible member to pull away from the concave wall thus allowing the pressure to be applied to the entire external surface of the flexible member. This unbalance of fluid pressures acting on the flexible member 17 immediately contracts the flexible member into sealing engagement with the central core 15, placing the flexible member in tension and forcing it into pressure engagement with a considerable axial area of the middle portion 15a of the central core. It is to be noted that, when the flexible member 17 is in sealing contact with the central core 15, the flexible member forms a double or S-shaped curve, the inlet end thereof forming an inwardly convex curved surface of short radius A and the portion thereof in engagement with the central core forming an inwardly concave curved surface of long radius R in contact with the central core 15.

The pressure with which the flexible member 17 is held in pressure engagement with the central core 15 is a function of the radii A and R, and the fluid pressures exerted on the flexible member, and the relationship of these variables may be expressed as follows. Assuming that $P_1$ is the fluid pressure in the space 44 and discharge passage 36, and that $P_2$ is the fluid pressure in the annular passage 16, the unit pressure P with which the flexible member bears against the central core 15 may, for the embodiment shown, be derived by equating the expressions for longitudinal tension in the flexible member 17 in terms of the differential pressures and radii in the curved portions of the flexible sleeve, as follows:

$$P = \frac{(P_1 - P_2)(2AR + A^2)}{R^2}$$

The above formula is based on the assumption that the length of the arc of the flexible member 17, defined by the radius A, is 90 degrees and that this arc is tangent to the spherical middle portion 15a of the surface of the central core 15 on a great circle thereof. Therefore, when the flexible member 17 is in engagement with the core member 15, as shown in full lines in Fig. 1, the curved portion of the flexible member having the radius A is subjected to a pressure differential of $P_1 - P_2$, and each element of the area of the curved portion is subjected to an inwardly acting radial force dependent on the intensity of the pressure differential $P_1 - P_2$. Since the member 17 is flexible and is supported only at its ends, the summation of the force components in the radial direction of all forces acting on the flexible member, referring to radial direction in the sense of the radius of the valve device as a whole, will be resisted by the force reaction at the anchorage thereof at the inlet end of the flexible member, and the summation of the force components in an axial direction acting on the flexible member will be resisted by the force reaction at the anchorage thereof at the outlet end. These reactions will be equal to each other and to the tension in the flexible member 17.

Obviously, the summation of all of the forces acting on the total area of the curved portion of the flexible member having the radius A is equal to the area of the projection of the curved portion on a plane normal to the axis of the valve device multiplied by the pressure differential thereon. The inner and outer radii of this projected area will be R and R+A, respectively, and the area will be:

$$\pi[(R+A)^2 - R^2]$$

which equals:

$$\pi(2AR + A^2)$$

The total force or tension acting in the axial direction is:

$$(P_1 - P_2)\pi(2AR + A^2)$$

The tension per unit of width of the flexible member is:

$$\frac{(P_1 - P_2)\pi(2AR + A^2)}{2\pi R}$$

which equals:

$$\frac{(P_1 - P_2)(2AR + A^2)}{2R}$$

The sealing force or bearing pressure of the flexible member 17 against the portion 15a of the core member 15, per unit of area of the contacting surfaces, is equal to the internal pressure which would be necessary in a complete sphere to produce the same unit tension in the wall thereof. The unit tension in the wall of a sphere subjected to internal pressure is:

$$\frac{P\pi R^2}{2R\pi} = \frac{PR}{2}$$

Since the sealing force or bearing pressure of the flexible member 17 against the portion 15a of the core member 15 is due to the tension in the flexible member 17, it is obvious that the bearing pressure P may be obtained by equating the expressions for unit tension in the flexible member and the wall tension in a sphere, and solving for P. Thus:

$$\frac{(P_1 - P_2)(2AR + A^2)}{2R} = \frac{PR}{2}$$

and:

$$P = \frac{(P_1 - P_2)(2AR + A^2)}{R^2}$$

It will thus be evident that the sealing pressure with which the flexible member 17 is held in engagement with the central core 15 may, by a suitable choice of relative dimensions of the parts, be made relatively great and entirely adequate to maintain the flexible member 17 in pressure engagement with the central core 15 against the action of the fluid pressure exerted by the fluid in the discharge passage 36. It will also be evident that, due to this mode of operation, my valve device 9 will satisfactorily operate as a check valve in any fluid flow line to prevent a reversal of flow of fluid upon a decrease in pressure in the supply end of the line under the pressure in the outlet.

The valve may be adjusted either to open or to remain closed when a surge in pressure occurs in the outlet piping 38, depending upon the adjustment of the valve 45 and whether the valve 53 is closed or open. If the valve 53 is closed and the valve 45 is in a position to restrict flow through the passages 40 and 41, as in the operation above described, and a surge takes place in the outlet piping 38 resulting in a greatly increased pressure in the outlet passage 36, it will be impossible for the increased pressure to immediately exert itself in the space 44 outside the flexible member 17, with the result that the increased pressure acting on the inside of the flexible member 17 will be unbalanced and force the member 17 away from the core 15 to open the valve and relieve the pressure in the outlet piping. If, however, the valve 53 is in the open position, direct unrestricted communication is established between the surge chamber 50 and the outlet piping, and the increased pressure due to the surge can then exert itself on the outside of the flexible member 17 by way of the valve 53, the check valve 52, the conduit 51, the surge chamber 50, the opening 48, and the apertures 43. Under these circumstances, the increased differential pressure between the space 44 and the passage 16 will hold the flexible member 17 in sealing contact with the core 15 against the increased pressure in the outlet passage 36, and the valve will remain closed.

In the alternative embodiment of my invention illustrated in Fig. 3, in which similar parts are given the same numerals as in Figs. 1 and 2, no surge chamber is employed and no connection between the space 44 and the outlet passage 36 is provided except through the passages 40 and 41, which in this embodiment are preferably larger in cross section than the corresponding passages in the embodiment of Figs. 1 and 2. In the form of the device illustrated in Fig. 3, a valve element 45 may be provided to regulate the flow through the passages 40 and 41, but the valve element 45 is preferably adjusted to a wide-open position.

In the operation of the valve device illustrated in Fig. 3, it will be evident that if the flexible member 17 is in the closed position illustrated in solid lines, and fluid pressure is applied in the annular passage 16 by reason of the starting of a pump connected to the inlet, the flexible member 17 will be forced away from the central core 15 and back into its open position indicated in dotted lines, exactly as described above in connection with the operation of the embodiment shown in Figs. 1 and 2. As the flexible member 17 is moved from its closed position into the open position shown in dotted lines 17a, the fluid in the space 44 is forced through the apertures 43 into the space 42 and out through the passages 40 and 41 into the discharge passage 36. If the fluid pressure in the annular passage 16 should drop due to the stopping of the pump or for any other reason, the tendency is for the flexible member 17 to be forced into the closed position. It is desirable that unrestricted communication exist between the space 44 outside of the flexible member 17 and the discharge passage 36 in order that all of the pressure of the fluid in the discharge passage 36 may be available to force the flexible member 17 to its closed position. Should the flexible member 17 not close immediately and fluid pass in a reverse direction through the main valve passage, it will be evident that the pressure of the fluid in the annular passage 16 will, by reason of the pressure drop in the valve, be less than the pressure of the fluid in the discharge passage 36 and in the space 44. This differential pressure will cause the movement of the flexible member 17 toward the closed position, and, as the flexible member 17 approaches the closed position, the pressure in the annular passage 16 becomes relatively less and less with respect to that in the discharge passage 36, and the tendency to close becomes greater. When the flexible member 17 engages the central core 15 and closes the main valve passage, the differential pressure between the space 44 and the annular passage 16 places the flexible member 17 in tension and forces it tightly over the convex middle portion 15a of the central core 15 to produce a tight sealing contact therewith.

It will be understood that the valve device of my invention may be employed to control the flow of fluid in fluid systems different from that disclosed herein, and that the design and construction of the valve device and the size and shape of the various parts thereof may be changed within wide limits without departing from the spirit and scope of the invention as defined in the appended claims.

I claim as my invention:

1. In a valve device, the combination of: a housing having a fluid passage therethrough; a collapsible flexible sleeve in said passage adapted when collapsed to shut off the flow of fluid through said passage, said sleeve normally being expanded outwardly during fluid flow through said passage; surge chamber means; fluid connections connecting said surge chamber means with the outlet of said passage and with a chamber surrounding the outside surface of said sleeve, whereby fluid pressure from said surge chamber means is available for collapsing said sleeve; and valve means in the fluid connection connecting said surge chamber means with said passage outlet whereby to selectively restrict fluid flow between said surge chamber means and said passage outlet.

2. In a valve device, the combination of: a housing having a fluid passage therethrough; a collapsible flexible sleeve in said passage adapted when collapsed to shut off the flow of fluid through said passage, said sleeve normally being expanded outwardly during fluid flow through said passage; surge chamber means having a fluid connection with a chamber surrounding the outside surface of said sleeve; a restricted fluid connection between the outlet end of said passage and said chamber surrounding said sleeve; and a check-valved fluid connection between said surge chamber means and the outlet end of said passage, said check-valved connection being adapted to permit flow of fluid from said outlet end of said passage toward said surge chamber means.

3. In a valve device, the combination of: a housing having a wall forming a fluid passage therethrough, a portion of said wall being outwardly concave from the center of said passage; a core member located within said passage opposite to said concave portion of said wall; a flexible sleeve in said housing and anchored at both ends in such manner as to provide slack in said sleeve, said sleeve being adapted in the open position of said valve device to assume an outwardly expanded position substantially conforming to the shape of said concave portion of said wall of said passage and in the closed position of said valve device to be held in sealing contact with said core; and means for conducting fluid under pressure to the outside surface of said sleeve to move said sleeve to said closed position.

4. In a valve device, the combination of: a housing having a wall forming a fluid passage therethrough, a portion of said wall being outwardly concave from the center of said passage; a core member located within said passage opposite to said concave portion of said wall and presenting a convex outer surface; a flexible sleeve in said housing and anchored at both ends in such manner as to provide slack in said sleeve, said sleeve being adapted in the open position of said valve device to assume an outwardly expanded position substantially conforming to the shape of said concave portion of said wall of said fluid passage and in the closed position of said valve device to be held in sealing contact with said convex surface of said core by reason of the tension in said sleeve caused by the difference in pressure on the two sides of said sleeve; and means for conducting fluid under pressure to the outside surface of said sleeve to move said sleeve to closed position.

5. In a valve device, the combination of: a housing having a wall forming a fluid passage therethrough, a portion of said wall being outwardly concave from the center of said passage; a core member located within said passage opposite to said concave portion of said wall; a flexible sleeve in said housing and surrounding said core member, said sleeve being substantially longitudinally non-extensible and anchored at both ends in such manner as to provide slack in said sleeve, said sleeve being adapted in the open position of said valve device to assume an outwardly expanded position substantially conforming to the shape of said concave portion of said wall of said fluid passage and in the closed position of said valve device to be held in sealing contact with said core member by reason of tension in said sleeve caused by a difference in fluid pressure on the two sides of said sleeve; and means for conducting fluid under pressure to the outside surface of said sleeve to move said sleeve to said closed position.

6. In a valve device, the combination of: a housing providing a fluid inlet, a fluid outlet, and a fluid passage through said valve device, said fluid passage having an outwardly concave portion; a core member located within said passage opposite to said concave portion of said fluid passage and presenting a convex outer surface; a flexible sleeve anchored at both ends in said housing in such manner as to provide slack in said sleeve, said sleeve being adapted in the open position of said valve device to assume an outwardly expanded position substantially conforming to the shape of said concave portion of said fluid passage and in the closed position of said valve device to be held in sealing contact with said convex surface of said core member by reason of tension in said sleeve caused by a difference in pressure on the two sides of said sleeve, said sleeve offering substantially no resistance to bending and being of such character that longitudinal tension is substantially the only force in said sleeve effective in determining the shape of said sleeve in the closed position; and a fluid connection between said fluid outlet and the surrounding surface of said sleeve.

7. In a valve device, the combination of: a housing providing a fluid inlet, a fluid outlet, and a fluid passage through said valve device; a core member supported from said housing and located within said passage and presenting a convex outer surface; a sleeve surrounding said core member and composed of resilient material having longitudinally disposed, substantially non-extensible reinforcement elements therein; and an apertured sleeve-supporting member surrounding said sleeve having an inner concave surface of substantially the same longitudinal length as said sleeve, the ends of said reinforcement elements being retained stationary relative to said sleeve-supporting member, said sleeve being adapted in the open position of said valve device to lie along the inner surface of said sleeve-supporting member and in the closed position of said valve device to be held in sealing contact with said core.

8. In a valve device, the combination of: a housing having a fluid passage therethrough; a core member located within said passage; a flexible sleeve anchored at both ends in such manner as to provide slack in said sleeve, said sleeve being adapted in the open position of said valve device to assume an outwardly expanded position to form a wall of said fluid passage and in the closed position of said valve device to be held in sealing contact with said core member by tension in said sleeve caused by a difference in fluid pressures on the two sides of said sleeve; an air chamber in fluid connection with the outside surface of said sleeve; and a restricted fluid connection between said air chamber and the outlet end of said passage, said connection being adapted to convey fluid from said outlet into said air chamber so as to put the air in said air chamber under substantially the same fluid pressure as exists in said outlet.

9. In a valve device, the combination of: a housing having a fluid passage therethrough; a core member located within said passage and having a convex outer surface; a flexible sleeve in said housing and anchored at both ends in such manner as to provide slack in said sleeve, said sleeve being adapted in the open position of said valve device to assume an outwardly expanded position to form a wall of said fluid passage through said valve and in the closed position of said valve device to be held in sealing contact with said convex surface of said core member by tension in said sleeve caused by a difference in fluid pressures on the two sides of said sleeve; an air chamber in fluid connection with the space surrounding said sleeve; a restricted fluid connection between said air chamber and the outlet end of said passage; and a check-valved fluid connection between said air chamber and said outlet end of said passage, said check-valved connection being adapted to permit a flow of fluid from said outlet end into said air chamber.

10. In a valve device, the combination of: a housing having a fluid passage therethrough; a core member located within said passage and presenting a convex outer surface; a flexible sleeve surrounding said core in said passage, said sleeve being longitudinally non-extensible and anchored at both ends in such manner as to provide slack in said sleeve, and said sleeve being adapted in the open position of said valve device to assume an outwardly expanded position to form a wall of said fluid passage, and in the closed position of said valve device to be held in sealing contact with said convex surface of said core member by tension in said sleeve caused by a difference in fluid pressures on the two sides of said sleeve; an air chamber in fluid connection with the space surrounding said sleeve; and a valved fluid connection between said air chamber and the outlet end of said passage.

11. In a valve device, the combination of: a housing having a wall forming a fluid passage therethrough, a portion of said wall being outwardly concave from the center of said passage; a core member positioned in said passage opposite to said concave portion of said wall; and a flexible sleeve in said housing and anchored at both ends in such manner as to provide slack in said sleeve, said sleeve being adapted in open position of said valve device to assume an outwardly expanded position substantially conforming to the shape of said concave portion of said wall of said passage, and in closed position of said valve device to assume a contracted position to engage said core member in sealing contact therewith, said sleeve being adapted to be expanded and contracted by pressure differential of the fluid on opposite sides of the sleeve.

12. In a valve device, the combination of: a housing means having a fluid passage therethrough said fluid passage having an inlet and an outlet; a core member positioned in said passage, said core member having a convex outer surface; a flexible sleeve surrounding said core member in said passage, said sleeve being movable between an expanded position in which it forms a wall of said passage and a collapsed position in which it engages a substantial axial area of said convex surface so as to form a sealing engagement with said convex surface, said sleeve when in said collapsed position having another curved portion not in engagement with said convex surface and curved oppositely relative thereto; and means for introducing pressure fluid into engagement with the outer surface of said sleeve to hold said sleeve in said sealing engagement, the sealing force exerted by said sleeve on said core member being expressed by the formula $$P=\frac{(P_1-P_2)(2AR+A^2)}{R^2}$$

in which $P=$ unit pressure exerted by said sleeve on said core member, $P_1=$ the pressure of said pressure fluid engaging the outer surface of said sleeve, $P_2=$ the pressure of said pressure fluid in said inlet, $R=$ the radius of said convex surface, and $A=$ the radius of said other curved portion of said sleeve.

13. A valve device having a core member and a flexible sleeve adapted to engage said core member in sealing engagement therewith so as to produce an S-curve in said flexible sleeve, only one-half of said curve being in engagement with said core member, in which the sealing force, P, exerted by said sleeve on said core member is expressed by the formula $$P=\frac{(P_1-P_2)(2AR+A^2)}{R^2}$$

in which $P_1=$ fluid pressure on the outside of said sleeve, $P_2=$ fluid pressure in one end of said sleeve, $R=$ the radius of said one-half of said curve, and $A=$ the radius of the other half of said curve.

14. In a valve device, the combination of: a housing having a fluid passage therethrough; a core member located within said passage, a slack flexible sleeve in said housing and surrounding said core member, said sleeve being anchored at one of its ends so as to form when contracted by fluid pressure a curved portion thereof extending convexly inwardly into engagement with said core member, the curvature of said curved portion creating a sealing force in said sleeve tending to form a seal between said sleeve and said core member; and means for admitting fluid under pressure into a space in said housing surrounding said sleeve, the sealing force exerted by the combination of the tension in and the curvature of said sleeve in response to the pressure differential across said sleeve maintaining said sleeve in sealing engagement with said core member to prevent a flow of fluid through said passage.

15. In a valve device, the combination of: a housing having a fluid passage therethrough, said fluid passage having a first end and a second end; a core member located within said passage intermediate said ends; a slack flexible sleeve in said housing and surrounding said core member, said sleeve being anchored at one of its ends adjacent said first end of said passage so as to form when contracted by fluid pressure a curved portion thereof extending convexly inwardly into engagement with said core member, there being an annular space in said housing around said sleeve member, the inward curvature of said curved portion of said sleeve together with the tension in said sleeve due to pressure differential across said sleeve creating a sealing force in said sleeve tending to form a seal between said sleeve and said core member; and means for admitting fluid under pressure from said second end of said passage into said space, the sealing force exerted by the curvature of said sleeve cooperating with the pressure of said fluid in said space to maintain said sleeve in sealing engagement with said core member to prevent a flow of fluid through said passage from said second end to said first end thereof.

16. In a valve device, the combination of: a housing having a fluid passage therethrough; a core member located within said passage, a portion of the surface of said core member being outwardly convex; a flexible sleeve in said housing and surrounding said core member, said sleeve having an inwardly convex portion extending inwardly into engagement with said convex portion of said core member when contracted by fluid pressure, the curvature of said convex portion of said sleeve creating a sealing force in said sleeve tending to form a seal between said sleeve and said core member; and means for admitting fluid under pressure into a space in said housing surrounding said sleeve, the force exerted by the curvature of said sleeve cooperating with the pressure of said fluid in said space to maintain said sleeve in sealing engagement with said core member to prevent a flow of fluid through said passage.

17. In a valve device, the combination of: a housing having an inlet and outlet for a fluid passage therethrough, a portion of the wall of said passage being outwardly concave; a core member in said passage disposed substantially opposite to said concave portion of said passage; a flexible sleeve surrounding said core member, said sleeve being movable from a first position in which it engages said core member to form a seal therewith closing said passage to a second position in which it is outwardly extended to open said passage and in which its inner surface is substantially parallel throughout its length to said concave portion of said passage; and means communicating with said outlet for admitting fluid under pressure into engagement with the external surface of said sleeve member to cause it to occupy said first position.

18. In a valve device, the combination of: a casing having an inlet, an outlet, and a passage therebetween; a seat member within said casing; a closure member within said casing comprising a slack flexible sleeve attached at its ends within said casing and normally engaging a peripheral portion of said seat member to close said passage, said closure member being disengageable from said seat member when the fluid pressure in said inlet rises to a predetermined value above the outlet pressure; and port means communicating between one side of said sleeve and said outlet to permit fluid to flow therethrough to cause said sleeve to reengage said seat member when the fluid pressure in said inlet falls to a predetermined value below the outlet pressure.

STEPHEN M. DUNN.